(12) United States Patent
Plahn

(10) Patent No.: US 7,646,113 B2
(45) Date of Patent: Jan. 12, 2010

(54) METHOD OF PROVIDING GENERATOR SET STANDBY POWER

(75) Inventor: Paul H. Plahn, Lino Lakes, MN (US)

(73) Assignee: Cummins Power Generation, Inc., Minneapolis, MN (US)

( * ) Notice: Subject to any disclaimer, the term of this patent is extended or adjusted under 35 U.S.C. 154(b) by 209 days.

(21) Appl. No.: 11/520,462

(22) Filed: Sep. 13, 2006

(65) Prior Publication Data

US 2008/0061629 A1   Mar. 13, 2008

(51) Int. Cl.
H02B 1/00   (2006.01)
H02B 1/24   (2006.01)

(52) U.S. Cl. .............................. 307/75; 307/64; 307/70

(58) Field of Classification Search .................. None
See application file for complete search history.

(56) References Cited

U.S. PATENT DOCUMENTS

| | | | | |
|---|---|---|---|---|
| 5,070,252 | A * | 12/1991 | Castenschiold et al. | 307/64 |
| 5,910,689 | A * | 6/1999 | Ertz et al. | 307/64 |
| 5,994,794 | A * | 11/1999 | Wehrlen | 307/66 |
| 6,134,124 | A * | 10/2000 | Jungreis et al. | 363/34 |
| 6,172,432 | B1 * | 1/2001 | Schnackenberg et al. | 307/23 |
| 6,181,028 | B1 | 1/2001 | Kern et al. | |
| 6,194,794 | B1 * | 2/2001 | Lampe et al. | 307/68 |
| 6,316,918 | B1 * | 11/2001 | Underwood et al. | 322/20 |
| 6,593,670 | B2 * | 7/2003 | Anderson | 307/64 |
| 6,686,547 | B2 | 2/2004 | Kern et al. | |
| 7,119,457 | B1 * | 10/2006 | Flegel | 307/64 |
| 7,208,850 | B2 * | 4/2007 | Turner | 307/64 |
| RE39,710 | E * | 7/2007 | Young et al. | 307/64 |
| 7,259,481 | B2 * | 8/2007 | Eaton et al. | 307/125 |
| 7,449,645 | B1 * | 11/2008 | Flegel | 200/51.11 |
| 7,462,791 | B1 * | 12/2008 | Flegel | 200/50.32 |
| 2002/0057145 | A1 * | 5/2002 | Kern et al. | 335/6 |
| 2002/0135232 | A1 * | 9/2002 | McMillan | 307/23 |
| 2003/0062775 | A1 * | 4/2003 | Sinha | 307/68 |
| 2004/0164701 | A1 * | 8/2004 | Hallidy | 318/767 |
| 2005/0116814 | A1 * | 6/2005 | Rodgers et al. | 340/310.01 |
| 2006/0072262 | A1 * | 4/2006 | Paik et al. | 361/62 |
| 2006/0220462 | A1 * | 10/2006 | O'Leary | 307/44 |
| 2006/0250759 | A1 * | 11/2006 | Gull et al. | 361/601 |
| 2007/0018506 | A1 * | 1/2007 | Paik et al. | 307/115 |
| 2008/0116898 | A1 * | 5/2008 | Washington | 324/521 |
| 2009/0058191 | A1 * | 3/2009 | Nordman et al. | 307/112 |

* cited by examiner

Primary Examiner—Stephen W Jackson
Assistant Examiner—Adi Amrany
(74) Attorney, Agent, or Firm—Hamre, Schumann, Mueller & Larson, P.C.; J. Bruce Schelkopf

(57) ABSTRACT

A method is provided for connecting a 110 V genset to a transfer switch feeding a 220 V service entrance such that all 220 V loads are automatically blocked out and all 110 V circuits are accessed. The method includes wiring of the genset to the transfer switch such that the two hot 220 V terminals on the genset entrance side of the transfer switch are connected together and wired to the hot 110 V side of the genset. The neutral lead of the transfer switch is connected to the neutral side of the genset, as per normal practice.

22 Claims, 1 Drawing Sheet

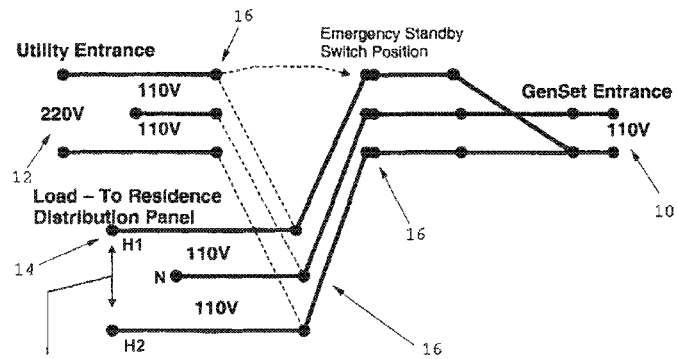

220V only available between hot contacts H1 and H2 when the transfer switch is in "normal utility" position;

0V available between hot contacts H1 and H2 when the transfer switch is in "emergency standby" position;

110V available between hot contact H1 and neutral contact N, and 110V available between hot contact H2 and neutral contact N, when the transfer switch is in either "normal utility" position or "emergency standby" position.

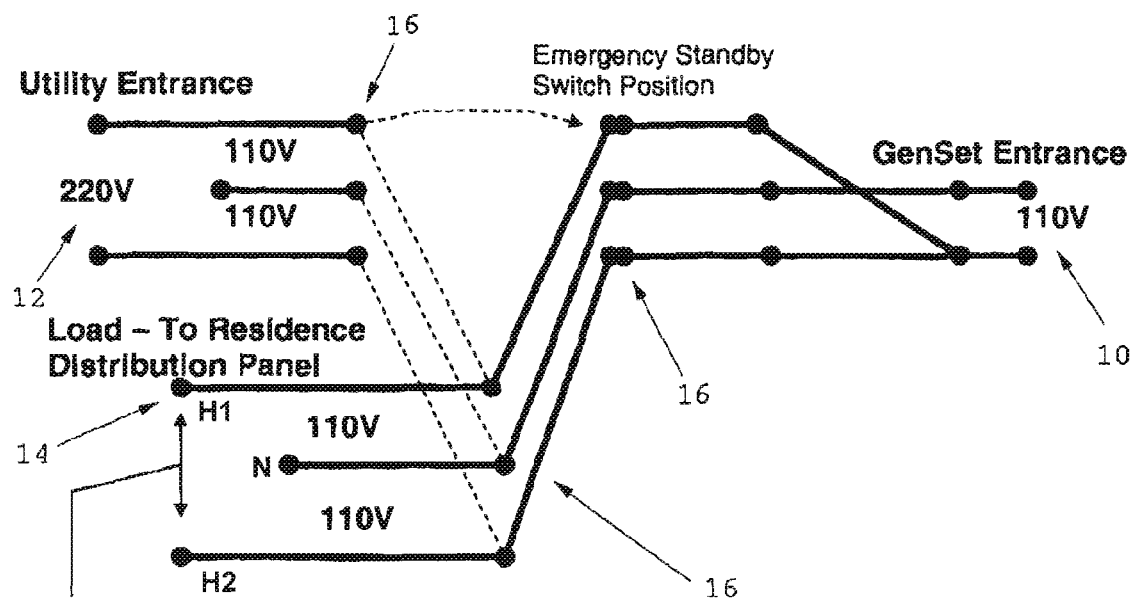

220V only available between hot contacts H1 and H2 when the transfer switch is in "normal utility" position;

0V available between hot contacts H1 and H2 when the transfer switch is in "emergency standby" position;

110V available between hot contact H1 and neutral contact N, and 110V available between hot contact H2 and neutral contact N, when the transfer switch is in either "normal utility" position or "emergency standby" position.

METHOD OF PROVIDING GENERATOR SET STANDBY POWER

BACKGROUND OF THE INVENTION

1. Field of the Invention

This invention relates to the field of electrical power generator sets (gensets), and more particularly to a method of wiring a small stand-by generator set (genset) to a residential home transfer switch.

2. Description of the Prior Art

A transfer switch is used to switch an electric load back and forth between a primary source, such as a utility, and a secondary source, such as a generator (genset). Transferring power from the primary source to the secondary source is necessary when the utility experiences a blackout. The transfer switch is also used to switch the power source back to utility power when the power outage is over.

If a modest size genset of 3-8 kW is connected to a residential house by means of a transfer switch at the distribution panel entrance, some method must be used to block the application of large loads that could overload the genset and cause the genset mounted circuit breaker to open. A genset of 5 kW can often power a typical profile of 110 V household loads, but cannot handle larger 220 V loads such as an electric stove, dryer, or central air conditioner.

Further, a three-wire 220 V service poses a problem unless a 220 V genset is used because typical distribution panels utilize two separate buses of 110 V power distributed to various loads. If a 110 V genset is used in association with such a three-wire 220 V service panel, then the distribution panel must be rewired so that all critical 110 V loads can be powered off one of the two buses; and then that bus must be attached to the load side of the transfer switch. The cost to connect a genset to an existing house is significantly less if the distribution panel does not have to be rewired, and if load management is not required.

Accordingly, it would be both beneficial and advantageous if a method could be provided to connect a 110 V genset to a transfer switch feeding a 220 V service entrance such that all 220 V loads are automatically blocked out and all 110 V circuits are accessed.

SUMMARY OF THE INVENTION

A method of connecting a 110 V genset to a transfer switch feeding a 220 V service entrance such that all 220 V loads are automatically blocked out and all 110 V circuits are accessed includes wiring of the genset to the transfer switch. The two hot 220 V terminals on the genset entrance side of the transfer switch are connected together and wired to the hot 110 V side of the genset. The neutral lead of the transfer switch is connected to the neutral side of the genset, as per normal practice.

The method is particularly beneficial in home standby applications that utilize a kWh meter socket mounted transfer switch and a 3-9 kW portable genset. The cost to apply standby power to an existing residence would then be very low since an electrician would not be required to rewire the existing distribution panel in order to block the 220 V kW loads and/or rewire all critical 110 V loads to a single 110 V bus. The reconnection is accomplished simply by how the genset is wired to the transfer switch.

According to one embodiment, a method of providing stand-by power from a 110V generator set (genset) to a residential load distribution panel comprises the steps of:

connecting together the corresponding set of hot 220V terminals on the genset entrance side of the transfer switch in a transfer switch comprising a utility entrance side including a set of hot 220V power utility service entrance contacts, a residential load distribution panel side including a set of residential load distribution panel contacts and a genset entrance side including a set of genset entrance contacts corresponding to the set of hot 220V power utility service entrance contacts; and connecting the corresponding set of connected hot 220V terminals on the genset entrance side of the transfer switch to a hot 110V side of the genset, such that an emergency standby transfer switch position blocks genset access to 220V residential loads connected to the residential load panel and further allows genset access to all 110V residential loads connected to the residential load panel.

According to another embodiment, a method of providing stand-by power comprises the steps of:

connecting together the corresponding set of hot service entrance contacts on the genset entrance side of the transfer switch in a transfer switch comprising a utility entrance side including a neutral service entrance contact and a set of hot service entrance contacts, a residential load distribution side including a set of residential load distribution contacts and a genset entrance side including a set of genset entrance contacts corresponding to the neutral service entrance contact and the set of hot service entrance contacts; and connecting the corresponding set of connected hot service entrance contacts on the genset entrance side of the transfer switch to a hot side of the genset, such that an emergency standby transfer switch position blocks genset access to undesired residential loads connected to the residential load distribution contacts and further allows genset access to all desired residential loads connected to the residential load distribution contacts.

According to yet another embodiment, a generator set (genset) standby power system comprises:

a transfer switch; and a genset, wherein a single hot terminal associated with the genset is connected to a pair of transfer switch contacts that are connected together on a genset entrance side of the transfer switch.

BRIEF DESCRIPTION OF THE DRAWINGS

Other aspects, features and advantages of the present invention will be readily appreciated as the invention becomes better understood by reference to the following detailed description when considered in connection with the accompanying drawing FIGURE wherein:

The FIGURE illustrates transfer switch wiring connections between a utility service entrance and a genset to a residential load via a distribution panel.

While the above-identified drawing FIGURE sets forth a particular embodiment, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

The FIGURE illustrates a set of conventional 110 V genset contacts 10 and a set of residential power utility service contacts 12 connected to a set of residential load panel distribution contacts 14 via a set of transfer switch contacts 16. The genset contacts 10 may be part of a 110 V genset readily available, for example, from Cummins Power Generation having a genset manufacturing facility at 1400 73$^{rd}$ Avenue N.E., Minneapolis, Minn.

The transfer switch contacts 16 are part of a transfer switch that is used to switch an electric load back and forth between a primary source, such as a utility, and a secondary source, such as a generator (genset). Transferring power from the primary source to the secondary source is necessary when the utility experiences a blackout. The transfer switch is also used to switch the power source back to utility power when the power outage is over. The transfer switch contacts 16 in this embodiment are employed to transfer power supplied via a set of utility service contacts 12 to power supplied by the genset via the genset contacts 10 whenever necessary, such as during a blackout condition discussed herein above. The FIGURE depicts connection of a genset to a residential load distribution panel via a set of transfer switch contacts during an emergency standby switch position.

If a modest size genset of 3-8 kW is connected to a residential house by means of a transfer switch at the distribution panel entrance, the method of wiring and control described herein with reference to the FIGURE can be used to block the application of large loads that could overload the genset and cause the genset mounted circuit breaker (not shown) to open. A genset of 5 kW can often power a typical profile of 110 V household loads, but cannot handle larger 220 V loads such as an electric stove, dryer, or central air conditioner, as discussed herein before.

Further, a three-wire 220 V service such as shown in the FIGURE poses a problem unless a 220 V genset is used, because typical distribution panels utilize two separate buses of 110 V power distributed to various loads such as also shown in the FIGURE. If a 110 V genset is used in association with such a three-wire 220 V service panel, then the distribution panel must be rewired so that all critical 110 V loads can be powered off one of the two buses; and then that bus must be attached to the load side of the transfer switch. The cost to connect a genset to an existing house is significantly less if the distribution panel does not have to be rewired, and if load management is not required. This problem is resolved via connecting a set of conventional 110 V genset contacts 10 and a set of residential power utility service contacts 12 to a set of residential load panel distribution contacts 14 via a set of transfer switch contacts 16 such as shown in the FIGURE.

In summary explanation, a method of connecting a 110 V genset to a transfer switch feeding a 220 V service entrance is implemented to automatically block out all 220 V loads and to automatically access all 110 V residential circuits. The method includes a change in the wiring normally employed when wiring a genset to the transfer switch. The two hot 220 V terminals on the genset entrance side of the transfer switch are connected together and wired to the hot 110 V side of the genset. The neutral lead of the transfer switch is connected to the neutral side of the genset as in normal genset wiring practice.

The invention may be embodied in other forms without departing from the spirit or essential characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A method of providing stand-by power from a 110V generator set (genset) to a residential load distribution panel, the method comprising the steps of:
   in a transfer switch comprising a utility entrance side comprising two hot power contacts having a potential difference of 220V therebetween, a residential load distribution panel side comprising two 220V load contacts respectively connected to two sides of a residential load distribution panel and a genset entrance side comprising two hot genset entrance power contacts that correspond to the two hot power contacts on the utility entrance side respectively, connecting together the two hot genset entrance power contacts on the genset entrance side of the transfer switch; and
   connecting the connected two hot genset entrance power contacts on the genset entrance side of the transfer switch to a hot 110V side of the genset, such that when the transfer switch is in an emergency standby transfer switch position, the genset applies effectively 0V to 220V residential loads connected to the residential load distribution panel and further allows all 110V residential loads connected to the two sides of the residential load panel to be served.

2. The method according to claim 1, wherein the step of connecting the connected hot genset entrance power contacts on the genset entrance side of the transfer switch to a hot 110V side of the genset comprises connecting the connected hot genset entrance power contacts on the genset entrance side of the transfer switch to a hot 110V side of a genset capable of generating power in the range of 3 kW to 9 kW.

3. The method according to claim 1, wherein the transfer switch is a kWh meter socket mounted transfer switch.

4. The method according to claim 1, further comprising the step of connecting a neutral contact on the genset entrance side of the transfer switch to a neutral contact of the genset.

5. The method according to claim 1, wherein each of the two hot genset entrance power contacts on the genset entrance side has a potential of 110V with respect to a neutral contact on the genset entrance side of the transfer switch.

6. The method according to claim 1, wherein connecting together the two hot genset entrance power contacts on the genset entrance side of the transfer switch including connecting together two conventional hot genset entrance power contacts on a genset entrance side of a conventional genset.

7. A method of providing stand-by power, the method comprising the steps of:
   in a transfer switch comprising a utility entrance side including a neutral service entrance contact and a pair of hot service entrance contacts, a residential load distribution side including a pair of residential load distribution contacts respectively connected to two sides of a residential load distribution panel and a genset entrance side including a neutral contact and a pair of power contacts that correspond to the neutral service entrance contact and the pair of hot service entrance contacts respectively, connecting together the contacts of the pair of power contacts on the genset entrance side of the transfer switch; and
   connecting the connected power contacts on the genset entrance side of the transfer switch to a hot side of the genset, such that when the transfer switch is in an emergency standby transfer switch position, the genset applies effectively 0V to large residential loads connected to the residential load distribution contacts and further allows all small residential loads connected to the residential load distribution contacts on the two sides of the residential load distribution panel to be served.

8. The method according to claim 7, wherein the step of connecting the connected power contacts on the genset entrance side of the transfer switch to a hot side of the genset comprises connecting the connected power contacts on the genset entrance side of the transfer switch to a hot side of a genset capable of generating power in the range of 3 kW to 9 kW.

9. The method according to claim 7, wherein the transfer switch is a kWh meter socket mounted transfer switch.

10. The method according to claim 7, further comprising the step of connecting the neutral contact on the genset entrance side of the transfer switch to a neutral contact of the genset.

11. A generator set (genset) standby power system, comprising:
   a transfer switch;
   a genset, wherein a single hot terminal associated with the genset is connected to a pair of transfer switch contacts that are connected together on a genset entrance side of the transfer switch; and
   wherein the transfer switch comprises a pair of residential load contacts on a residential load distribution panel side connectable to two sides of a residential load distribution panel such that when the transfer switch is in an emergency standby transfer switch position, the genset applies effectively 0V to large residential loads and further allows all small residential loads connected to the two sides of the residential load distribution panel to be served.

12. The genset standby power system according to claim 11, wherein the pair of transfer switch contacts connected together correspond to a pair of hot utility entrance contacts.

13. The genset standby power system according to claim 12, wherein the pair of hot utility entrance contacts are 220V contacts.

14. The genset standby power system according to claim 13, wherein the single hot terminal associated with the genset is a 110V terminal.

15. The genset standby power system according to claim 11, further comprising a residential service distribution panel connected to the transfer switch such that when the transfer switch is in an emergency standby transfer switch position, the genset applies effectively 0V to large residential loads connected to the residential load distribution panel and further allows genset access to all small residential loads connected to the residential load distribution panel.

16. The genset standby power system according to claim 15, wherein the large residential loads are 220V loads, and further wherein the small residential loads are 110V loads.

17. The genset standby power system according to claim 11, wherein the transfer switch is a kWh meter socket mounted transfer switch.

18. The genset standby power system according to claim 11, wherein the genset is capable of generating power in the range of 3 kW to 9 kW.

19. The genset standby power system according to claim 18, wherein the genset is a portable genset.

20. The genset standby power system according to claim 11, wherein the transfer switch is a three-wire 220 V service transfer switch.

21. The genset standby power system according to claim 11, wherein the transfer switch is a residential home transfer switch.

22. A wiring apparatus adapted to connect a 110V generator set (genset) standby power system to a residential load distribution panel having two sides with large and small residential loads, comprising:
   a pair of hot contacts having a potential difference of 220V therebetween on a transfer switch side of the wiring apparatus, the pair of hot contacts being adapted to be connected to a pair of 220V transfer switch contacts, the pair of hot contacts being connected together at a connection point,
   a single hot terminal on a genset entrance side of the wiring apparatus, the single hot terminal being adapted to be connected to a hot 110V side of the 110V generator set (genset) standby power system,
   the single hot terminal being connected to the connection point of the wiring apparatus such that large residential loads connected to the residential load distribution panel are provided with effectively 0V and further that all small residential loads connected to the two sides of the residential load distribution panel are served.

\* \* \* \* \*